Patented Nov. 17, 1925.

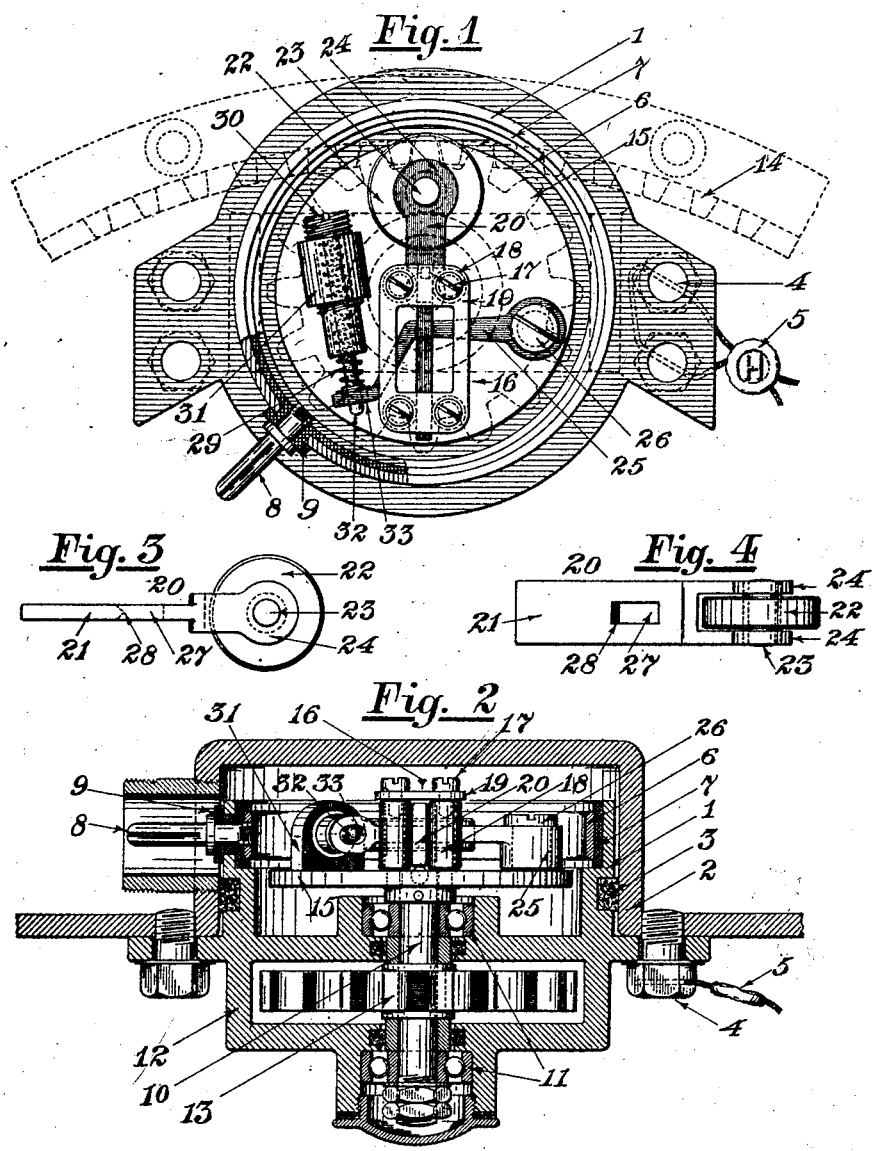

1,561,785

UNITED STATES PATENT OFFICE.

JOHN W. HILL AND HENRY C. HILL, OF WYOMING, OHIO.

AUTOMATIC SPEED CONTROLLER.

Application filed January 19, 1925. Serial No. 3,539.

*To all whom it may concern:*

Be it known that we, JOHN W. HILL and HENRY C. HILL, both citizens of the United States, both residing in Wyoming, Hamilton County, State of Ohio, have jointly invented certain new and useful Improvements in Automatic Speed Controllers, of which the following is a specification.

Our invention relates to that type of automatic speed controllers which are mounted upon and take motion from the running gear of the vehicle, and operate by suppressing the electric current to the spark plugs or by cutting off the flow of gas to the engine or by doing both, when the predetermined travel speed limit has been reached by the vehicle, and its purpose is to produce a simple, practical, safe and durable device, capable of universal adaptation to automobiles at a moderate cost.

The necessity for reasonable safety to pedestrians and others, and to property, in the operation of automobiles on public highways, has become so strong in some localities as to cause the demand for ordinances which shall rigidly limit the travel speed and require the use of automatic mechanical speed controllers, which take away from careless, indifferent and incompetent drivers the opportunity to damage life, limb or property in the operation of automobiles, so far as this can be accomplished by the arbitrary limit of travel speed.

In the accompanying drawings in which similar letters and figures indicate similar parts, Figure 1, shows the controller in vertical elevation with cover removed disclosing the internal operating mechanism. Figure 2, is a horizontal sectional elevation with the rim of the enclosing case cut away, taken at right angles to the plane of Figure 1. Figure 3 shows in plan the sliding bolt and contact roller to be described later. Figure 4, shows the sliding bolt and roller in elevation. 1, is a metallic case closed against dust and moisture by a cap, 2, on a rubber ring or gasket 3, and sealed against tampering with speed adjustment by a screw 4, and lead seal and wire 5. On the inside of the case and concentric thereto is placed a steel contact ring 6, insulated from the case by the fiber ring 7. 8 is an electrical conductor attached to the ring 6, and insulated from the grounded case 1 by the bushing 9. 8 acts as a lead or ground leak from the induction coil in a battery system or as the ground connection in a high tension magneto system, in neither case can the ground be completed until the contact member 22 impinges the contact ring 6.

10, is a horizontal shaft mounted in ball bearings 11, in the housing 12, of the case 1. 13, is a pinion secured to the shaft 10 and engaging a ring gear 14, mounted on one of the forward steering wheels of the automobile. (Motion may be imparted to the controller from the transmission shaft if required to adapt it to an automobile.) The revolutions of the ring gear are determined by the revolutions of the steering wheels, and the revolutions of the latter by the travel speed of the vehicle.

The revolutions of the shaft 10, are therefore always proportional to the travel speed of the automobile.

On the inner end of the shaft 10, is secured a disc or metal driver 15, which revolves with the shaft 10, and carries a driving mechanism 16, consisting of the screw head studs 17, screwed into the disc 15, friction rollers 18, mounted on the studs, and a steady plate 19, which acts as a strut or support to the studs 17, and retains the friction rollers 18, and sliding bolt 20 in place.

20, is a sliding bolt riding on and revolving with the disc 15. The flattened tail 21, of the bolt being arranged to engage and slide axially between the friction rollers 18. The rotation of the member 15, through the driving mechanism described, also rotates the bolt 20, and develops the centrifugal force required to cause the active contact member 22, to impinge the passive contact member 6. The active contact member 22, turns on a ball-bearing on the shaft 23, mounted in the fork 24, of the sliding bolt 20.

25, is a bent lever oscillating on a pivot 26, attached to and revolving with the disc 15. This lever passes through a slot 27, in the flattened tail 21, of the bolt 20, and oscillates on its pivot coincident with the axial motion of the bolt 20.

The point of contact of the lever 25, and the slot in the tail of the sliding bolt 20, is made on a knife edge shown at 28, with case hardened surfaces on the lever and knife edge to eliminate objectionable friction.

The free end of the bent lever 25, engages a spiral reaction spring 29, mounted in a barrel 30, and abutment 31, attached to and revolving with the disc 15. The spring barrel 30, is threaded on the outside and the abutment or nut 31, is threaded on the inside and by rotating the nicked head of the spring barrel more or less pressure can be applied to the spring 29, and the centripetal force on the sliding bolt 20, accordingly varied. The spring barrel 30, is provided with a spindle 32, concentric to the barrel, the lower end of which passes through a slot 33, in the free end of the lever 25, and supports and guides the spring 29. By altering the pressure on the spring 29, by means of the adjustable barrel 30, the travel speed at which the contact member 22, on the sliding bolt 20, impinges the insulated ring 6, will be correspondingly varied and in this manner the controller be adjusted to any desired automobile travel speed within its range of action.

Revolutions of the disc 15, and sliding bolt 20, being coincident and proportional to the travel speed of the automobile, it is obvious that by adjustment of the compression of the reaction spring 29, the limiting travel speed of the automobile may be accurately predetermined.

What we claim is:—

1. An automatic speed controller for automobiles, mounted upon and driven by the running gear of the vehicle, comprising a circular case closed by a hermetically sealed cap, a rotatable shaft mounted in the hub of said case, said shaft having a pinion on its outer end taking motion from the running gear, and provided at its inner end with a rigidly attached disc and driver mechanism rotating with said shaft, a radially sliding bolt mounted upon and actuated by said driver, an adjustable spring to resist the outward sliding movement of said bolt, a lever communicating motion from said bolt to said adjustable spring, an adjustable spring barrel to regulate the compression of said spring, a roller mounted upon the outer end of said bolt, and an insulated contact ring mounted in the rim of said case, which is impinged by said roller when the predetermined speed limit has been reached and closes an electric circuit.

2. An automatic speed controller for automobiles mounted upon and actuated by the running gear of the vehicle, a circular case rigidly attached to the running gear, a rotatable shaft mounted in the hub of said case, means to rotate said shaft coincident with the travel speed of said vehicle, a driver mounted upon and rotating with said shaft, a radially sliding bolt mounted upon and rotating with said driver and sliding outwardly thereon when actuated by centrifugal force, means to guide said bolt radially and to retract it when the centrifugal force is reduced, an anti-friction roller mounted upon and moving radially with said bolt, an insulated contact ring mounted in the rim of said case and provided with a suitable electrical connection, so arranged and operating that when said roller by revolution of said shaft and driver impinges said ring the travel speed of the vehicle will be checked and held within the predetermined limit.

3. An automatic speed controller for automobiles mounted upon and actuated by the running gear of the vehicle, comprising a circular case rigidly attached to the running gear, a central hub on said case, a rotatable shaft mounted in said hub, said shaft carrying at the outer end and rigidly attached thereto a means of rotation, and at the inner end within said case a driver, a movable member mounted upon and actuated by said driver when rotated, means adjustable to counter-act and control the outward movement of said actuated movable member, an insulated contact member mounted in the rim of said case, an electrical connection attached to said contact member, said actuated movable member moving outwardly as said shaft and driver are rotated until at a predetermined speed of rotation thereof said actuated movable member impinges said insulated contact member and closes an electric circuit.

4. An automatic speed controller for automobiles mounted upon and driven by the running gear of the vehicle, comprising a circular case enclosed by a hermetically sealed cap, a rotatable shaft mounted in the hub of said case, carrying a pinion at its outer end and taking rotary motion from the running gear, and having rigidly attached at its inner end a driver, a radially sliding bolt mounted upon and actuated by said driver, an anti friction roller mounted at the outer end of said bolt, an insualted contact ring mounted in the rim of said circular case, means to cause said sliding bolt to move radially outward and impinge said ring when a predetermined travel speed has been reached, means to retract said bolt when the outward moving means has been reduced, means to adjust the force of said retraction means, the combination operating to close an electrical circuit.

In testimony whereof, we affix our signatures at Cincinnati, Ohio, this 16th day of January, 1925.

JOHN W. HILL.
HENRY C. HILL.